United States Patent
McDonald et al.

(10) Patent No.: US 9,458,023 B2
(45) Date of Patent: Oct. 4, 2016

(54) USE OF AQUEOUS ALKALI ALUMINOSILICATE FOR PROFILE MODIFICATION, WATER CONTROL AND STABILIZATION

(71) Applicants: Michael J. McDonald, Toronto (CA); Neil Miller, King of Prussia, PA (US); Janice Hamilton, Oakville (CA)

(72) Inventors: Michael J. McDonald, Toronto (CA); Neil Miller, King of Prussia, PA (US); Janice Hamilton, Oakville (CA)

(73) Assignee: PQ CORPORATION, Malvern, PA (US)

( * ) Notice: Subject to any disclaimer, the term of this patent is extended or adjusted under 35 U.S.C. 154(b) by 125 days.

(21) Appl. No.: 14/021,503

(22) Filed: Sep. 9, 2013

(65) Prior Publication Data
US 2014/0076568 A1 Mar. 20, 2014

Related U.S. Application Data

(60) Provisional application No. 61/703,467, filed on Sep. 20, 2012.

(51) Int. Cl.
*C01B 33/26* (2006.01)
*E21B 33/138* (2006.01)

(52) U.S. Cl.
CPC .................. *C01B 33/26* (2013.01)

(58) Field of Classification Search
CPC ................ C01B 33/26; E21B 33/138
See application file for complete search history.

(56) References Cited

U.S. PATENT DOCUMENTS

| | | | |
|---|---|---|---|
| 1,421,706 A | 7/1922 | Van Auken Mills | |
| 2,402,588 A | 6/1946 | Andresen | |
| 3,492,137 A | 1/1970 | Iler et al. | |
| 3,625,722 A | 12/1971 | Freyhold et al. | |
| 3,658,131 A | 4/1972 | Biles | |
| 4,031,958 A * | 6/1977 | Sandiford | C09K 8/601 166/270 |
| 4,257,483 A * | 3/1981 | Morris | E21B 31/03 166/292 |
| 4,257,813 A | 3/1981 | Lawrence et al. | |
| 4,732,213 A | 3/1988 | Bennett et al. | |
| 4,812,299 A * | 3/1989 | Wason | 423/329.1 |
| 4,983,218 A | 1/1991 | Mascioli | |
| 5,112,402 A * | 5/1992 | Freeman et al. | 106/416 |
| 5,186,746 A * | 2/1993 | Freeman | 106/416 |
| 5,316,576 A * | 5/1994 | Freeman | 106/483 |
| 5,351,757 A | 10/1994 | Chou et al. | |
| 5,591,256 A * | 1/1997 | Freeman et al. | 106/483 |
| 5,624,651 A | 4/1997 | Bass | |

(Continued)

OTHER PUBLICATIONS

International Search Report and Written Opinion for PCT/US13/60334 dated Feb. 6, 2014.

(Continued)

*Primary Examiner* — Zakiya W Bates
*Assistant Examiner* — Crystal J Miller
(74) *Attorney, Agent, or Firm* — Buchanan Ingersoll & Rooney PC (57) ABSTRACT

Embodiments of the invention relate to methods for making and compositions including aqueous alkali aluminosilicates used for conformance. The aqueous alkali aluminosilicates provide similar reaction characteristics of alkali silicates, and in addition provide enhanced conformance properties due to their ability to crystallize.

9 Claims, 4 Drawing Sheets

(56) References Cited

U.S. PATENT DOCUMENTS

| | | |
|---|---|---|
| 6,059,036 A | 5/2000 | Chatterji et al. |
| 6,561,269 B1 | 5/2003 | Brown et al. |
| 7,740,068 B2 | 6/2010 | Ballard |
| 2001/0053741 A1* | 12/2001 | Micco et al. .................. 502/79 |
| 2003/0050219 A1* | 3/2003 | Micco .................. C01B 39/023 510/507 |
| 2008/0087429 A1 | 4/2008 | Brannon et al. |
| 2008/0190614 A1* | 8/2008 | Ballard .................. C09K 8/032 166/293 |
| 2009/0288820 A1 | 11/2009 | Barron et al. |
| 2011/0073311 A1* | 3/2011 | Porcherie ............. C04B 28/006 166/305.1 |
| 2012/0067576 A1* | 3/2012 | Reyes ..................... C09K 8/74 166/279 |
| 2012/0245059 A1 | 9/2012 | McDonald |

OTHER PUBLICATIONS

Krumrine et al., "Profile Modification and Water Control With Silica Gel-Based Systems", Society of Petroleum Engineers, SPE13578 presented at International Symposium on Oilfield and Geothermal Chemistry, Phoenix, Arizona Apr. 9-11, 1985, pp. 1-9.

Kirk-Othmer, "Silica", Encyclopedia of Chemical Technology, 1997, Fourth Edition, vol. 21, John Wiley & Sons.

\* cited by examiner

USE OF AQUEOUS ALKALI ALUMINOSILICATE FOR PROFILE MODIFICATION, WATER CONTROL AND STABILIZATION

CROSS-REFERENCE TO RELATED APPLICATIONS

This application claims priority to U.S. Provisional Patent Application No. 61/703,467 filed in the United States Patent and Trademark Office on Sep. 20, 2012 and is incorporated herein by reference.

FIELD OF THE INVENTION

This invention relates to the blocking and strengthening of permeable zones in subterranean environments using aqueous alkali aluminosilicate. These applications include the control of water and gas flows for oil field, grouting for construction, and water shut-off for mining.

BACKGROUND OF THE INVENTION

The focus of the patent is on oilfield applications that include lost circulation, cement repair, sand consolidation and conformance applications. The term conformance describes the management and alteration of water and gas flows in a subterranean environment to optimize hydrocarbon production. The term "water shut-off" is often used interchangeably with conformance. Water shut-off represents a major subset of conformance and refers to such problems as water flow through fractures, thief zones, high permeability streaks and water coning, or lack of integrity in cement. This technology is easily adapted to the grouting and mining industry where there are similar challenges with water shut-off and stabilization. These applications and industries have all used soluble alkali silicates mainly in the form of sodium silicate.

Alkali silicates have an extremely versatile chemistry that allows them to be engineered to solve a great range of conformance and stabilization problems. Depending on choice of setting agents, set times for silicates can range from instant to days. The set silicate can range from a ringing silica gel to a cementitious material. Sodium silicate has been used since the 1920's to solve a wide range of downhole issues in oilfield. The chemistry of sodium silicate for conformance has been well documented in the literature. P. H. Krumrine and S. D. Boyce, Profile Modification and Water Control with Silica Gel-Based Systems, SPE 13578 presented at the 1985 SPE International Symposium on Oilfield and Geothermal Chemistry, Phoenix, Ariz., Apr. 9-11, 1985 is a leading article on the subject. This paper presents the chemistry, properties, benefits, limitations, methods and provides an extensive list of potential setting agents, and is incorporated herein by reference.

Sodium silicate is typically formulated to undergo a gelation reaction or a precipitation reaction. If downhole conditions do not provide a suitable environment for the gelation and/or precipitation of sodium silicate, a setting agent can be used to initiate the reaction. Precipitation systems are formulated to take advantage of sodium silicate reacting with metal cations (e.g., $Ca^{2+}$, $Mg^{2+}$, $Zn^{2+}$, $Al^{3+}$, $Fe^{3+}$). The best example of this type of formulation is a solution of calcium chloride placed in the troubled area, followed by a water spacer followed by a solution of sodium silicate. Once mixed, the sodium silicate reacts with the calcium to form calcium silicate.

Given that the reaction between sodium silicate and metal cations is nearly instantaneous, the catalyst cannot be mixed on the surface with the sodium silicate. Rather, the catalyst must be applied separately from the sodium silicate. These systems are typically used near-wellbore.

Gelation systems are formulated with a sufficient quantity of weakly basic, neutral or acidic material to reduce the pH of a sodium silicate solution to a point where the sodium silicate will self-polymerize into a silica gel. It is understood in the art that a great variety of inorganic, organic and natural compounds can initiate this reaction.

Sodium silicate can also be used as a component of a cement mix. Cements can be traditional Portland-based cements as well as Pozzolanic-based materials such as flyash, or blast furnace slag. It is generally accepted that for Pozzolanic-based cements, alkali silicates (sodium silicate) is an effective activator since it acts as a source of alkali and reactive silica.

While sodium silicates are formulated to obtain a specific type of chemical reaction, once placed in a downhole environment several different types of chemical reactions can occur over time. These include cation exchange with mineral surroundings and dehydration.

There are several reasons often cited for choosing sodium silicate-based technology for conformance applications. These reasons include:
  initial low viscosity which promotes penetration;
  small molecular weight which promotes penetration;
  excellent thermal stability;
  excellent chemical stability;
  high strength on setting;
  can be formulated with a wide range of set times;
  environmentally friendly; and
  cost effectiveness.

Alkali silicate-based technology does have limitations. Set times can be difficult to control due to exposure to contaminants such as salt, metals and organics. Changes in reservoir conditions and temperature also impact set times. Depending on the contamination, there can also be severe loss of strength. Gelled alkali silicates also have the further disadvantage of syneresis. While alkali silicates have excellent strength and chemical and thermal resistance, there is always a need for higher levels of each. Increased mechanical strength would allow greater use in high temperature and high temperature reservoirs or casing repair applications. Over the years, many processes have been proposed for improving silicate-based technology for blocking, sealing or consolidating high permeability zones, channels, fissures and the like. These methods have been disclosed in U.S. Pat. Nos. 1,421,706; 3,658,131; 4,031,958; 4,257,813; 6,059,036; and 7,740,068. All these patents share the feature of using standard, commercially available sodium silicate as the source of alkali silicate.

Silicates which are used for conformance applications are water soluble silicates which have a weight ratio of $SiO_2$ to $Me_2O$ where Me is the alkali metal and is most commonly sodium or potassium. For commercially available aqueous sodium silicate, the weight ratio of $SiO_2$ to $Na_2O$ is generally 1.6 to 3.25. For commercially available aqueous potassium silicate, the weight ratio of $SiO_2$ to $K_2O$ is generally 1.6 to 2.5. Table 1 below, which is derived from U.S. Pat. No. 7,740,068 to Ballard, presents the composition and typical properties of commercial grades of liquid sodium silicate and potassium silicate.

TABLE 1

| PQ Corporation Product Name | SiO$_2$/Me$_2$O | % SiO$_2$ | % Me$_2$O | % Solids | Density (20° C.) | |
|---|---|---|---|---|---|---|
| Potassium Silicates | | | | | | |
| KASIL ® 1 | 2.5 | 20.8 | 8.3 | 29.1 | 10.5 | ppg |
| KASIL ® 6 | 2.1 | 26.5 | 12.65 | 39.15 | 11.5 | ppg |
| KASIL ® 33 | 2.1 | 24.4 | 11.6 | 36.0 | 11.2 | ppg |
| KASOLV ® 16 | 1.6 | 52.8 | 32.5 | 85.3 | 43.0 | lb/ft$^3$ |
| KASIL ® 1624 | 1.65 | 15.0 | 9.1 | 24.1 | 10.16 | ppg |
| KASIL ® 2130 | 2.1 | 20.0 | 9.5 | 29.5 | 10.6 | ppg |
| KASIL ® 2135 | 2.18 | 24.0 | 11.0 | 35.0 | 11.15 | ppg |
| KASIL ® 2.5 | 2.5 | 71.0 | 28.4 | 99.4 | 77.5 | lb/ft$^3$ |
| KASIL ® SS | 2.5 | 71.0 | 28.4 | 99.4 | 57.4 | lb/ft$^3$ |
| AGSIL ™ 25H | 2.5 | 60.65 | 24.25 | 84.9 | — | |
| Sodium Silicates | | | | | | |
| A ® 1647 | 1.6 | 28.8 | 18.0 | 46.8 | 13.40 | ppg |
| A ® 1847 | 1.8 | 30.20 | 16.78 | 46.98 | 13.24 | ppg |
| A ® 2445 | 2.4 | 32.2 | 13.4 | 45.6 | 12.8 | ppg |
| A ® 2447 | 2.40 | 33.2 | 13.9 | 47.1 | 13.0 | ppg |
| A ® 2645 | 2.58 | 32.1 | 12.5 | 44.6 | 12.63 | ppg |
| BJ ™ 120 | 1.80 | 23.7 | 13.15 | 36.85 | 11.9 | ppg |
| BW ™ 50 | 1.60 | 26.2 | 16.75 | 42.55 | 12.7 | ppg |
| C ™ 50 | 2.0 | 36.00 | 18.00 | 54.0 | 14.1 | ppg |
| D ™ | 2.00 | 29.4 | 14.7 | 44.1 | 12.8 | ppg |
| E ™ | 3.22 | 27.7 | 8.6 | 36.3 | 11.5 | ppg |
| K ® | 2.88 | 31.7 | 11.0 | 42.7 | 12.3 | ppg |
| M ® | 2.58 | 32.1 | 12.4 | 44.5 | 12.6 | ppg |
| N ® | 3.22 | 28.7 | 8.9 | 37.6 | 11.6 | ppg |
| N ® 38 | 3.22 | 28.7 | 8.9 | 34.6 | 11.3 | ppg |
| N ® 38 Clear | 3.22 | 28.7 | 8.9 | 37.6 | 11.6 | ppg |
| O ® | 3.22 | 29.5 | 9.1 | 38.6 | 11.8 | ppg |
| OW ® | 3.22 | 29.46 | 9.15 | 38.61 | — | |
| RU ™ | 2.40 | 33.0 | 13.9 | 47.1 | 13.0 | ppg |
| SS ® | 3.22 | 75.7 | 23.5 | 99.2 | (11.8) | ppg |
| SS ® 22 | 3.22 | 75.7 | 23.5 | 99.2 | 1.44 | g/cm$^3$ |
| SS ® 75 | 2.75 | 72.9 | 26.5 | 99.4 | (11.8) | ppg |
| Star ™ | 2.50 | 26.5 | 10.6 | 37.1 | 11.7 | ppg |
| Starso ™ | 1.80 | 24.12 | 13.40 | 37.52 | 12.0 | ppg |
| Stixso ™ RR | 3.25 | 30.0 | 9.2 | 39.2 | 11.8 | ppg |
| V ™ | 2.50 | 26.5 | 10.6 | 37.1 | 11.7 | ppg |

Although the properties vary among these alkali silicates, they share the common characteristic of being infinitely soluble in water. These soluble silicates are commonly used to block and strengthen permeable zones in subterranean formations. These applications include conformance for oil field, grouting for the construction industry, and water shut-off for mining.

Although commonly used, these alkali silicate reactions may be negatively affected as follows:

reaction rate for gelation is sensitive to the presence of salt (NaCl);
gels may exhibit syneresis when formed in excess water; and
fresh water zones require treatment with a multivalent cation to initiate precipitation.

There is a need for an agent that exhibits the reaction properties of alkali silicates without any of the effects described above. Any further increase in mechanical strength properties would also allow for greater application.

SUMMARY OF THE INVENTION

The present invention relates to an alkali silicate such as sodium silicate that has been reacted with aluminum. This aluminum modified sodium silicate can undergo the same setting reactions associated with alkali silicate. The aqueous alkali aluminosilicate (also called AAAS) shows a higher tolerance towards contaminants and has a more controllable set than standard sodium silicate. Upon setting, aqueous alkali aluminosilicate shows higher mechanical strength, greater water resistance and less syneresis than commercially grade sodium silicates. In addition the aqueous alkali aluminosilicate material can be made to crystallize to yield a hard, durable aluminosilicate crystal. Another positive benefit is the initial flexibility of the aluminosilicate set that allows for easier placement.

It has been discovered that by modifying soluble silicate with aluminum the resulting novel, aqueous alkali aluminosilicate could undergo the traditional setting reactions associated with sodium silicate and could also be made to crystallize. The crystallization reaction can be initiated by (but not limited to) dilution with water and increasing the temperature in downhole conditions. It is believed that the crystallization reaction may also be initiated by increasing the pressure in the downhole, agitating the alkali aluminosilicate in the downhole, and introducing seed crystals into the alkali aluminosilicate solution.

Further, this novel aluminosilicate can be made to crystallize in a subterranean environment and be used to modify profile, control water and provide stabilization.

Aqueous alkali aluminosilicate retains the same chemical reactions associated with an aqueous alkali silicate such as sodium silicate. In addition aqueous alkali aluminosilicate can undergo a crystallization reaction. Once placed in a subterranean environment, the aqueous alkali aluminosilicate can be made to crystallize under conditions that would not set sodium silicate. It is anticipated that the aluminosilica crystals will act as blocking agents in porous zones and/or microfractures. Unreacted aqueous alkali aluminosilicate can still undergo the chemical reactions of gelation, precipitation, cation exchange and dehydration. These additional reactions provide further blocking and consolidation.

Aqueous alkali aluminosilicate will provide the same benefits associated with sodium silicate along with additional benefits such as:

a) fresh water zones need not be treated with a dissolved metal multivalent cation to initiate a precipitation reaction;
b) the crystallization reaction is not adversely affected by the presence of NaCl;
c) water and hydrocarbon zones need not be clearly separated;
d) greater tolerance towards organic contaminants
e) alumino-silica crystals will act as blocking agents;
f) more controllable set times
g) higher green strength
h) higher final mechanical strength on setting and greater resistance to water
i) product is subject to less syneresis.

Aqueous alkali aluminosilicates of this invention are not considered to be zeolites. For example, U.S. Pat. No. 7,544,642 provides that all zeolites are composed of a natural or manmade three-dimensional framework of SiO$_4$ and AlO$_4$ in a tetrahedron, which creates a very high surface area. Cations and water molecules are entrained into the framework. Thus, all zeolites may be represented by the crystallographic unit cell formula:

$$M_{a/n}[(AlO_2)_a(SiO_2)_b] \cdot xH_2O$$

where M represents one or more cations such as Na, K, Mg, Ca, Sr, Li or Ba for natural zeolites and NH$_4$, CH$_3$NH$_3$, (CH$_3$)$_3$NH, (CH$_3$)$_4$N, Ga, Ge and P for manmade zeolites; n represents the cation valence, the ratio of b:a is in a range from greater than or equal to 1 and less than or equal to 5; and x represents the moles of water entrained into the zeolite framework. An example of a common zeolite is zeolite A, which as a molar ratio of Na$_2$O:Al$_2$O$_3$:SiO$_2$ of 1:1:2.

The aqueous aluminosilicate described herein is amorphous and does not have a porous crystal structure nor does it have a high surface area. Stoichiometrically, the ratio of silicon to aluminum, i.e., the b:a ratio, for the aluminosilicate described herein is greater than 5 expressed in crystallographic unit cell formula for zeolite. Further, the ratio of monovalent cations ($M_a$) to aluminum is greater than 1. The resulting physical properties of aqueous alkali aluminosilicate are different than those of a zeolite. One key difference is aqueous alkali aluminosilicate is an aqueous solution while zeolite is a solid.

DETAILED DESCRIPTION OF THE PREFERRED EMBODIMENTS

It has been discovered that aqueous aluminosilicate can be made to set under a variety of different conditions to yield a hard, durable and useful product Further, these aqueous alkali aluminosilicate products can also be made to crystallize in a particularly useful manner for subterranean applications.

Aqueous alkali aluminosilicate is an aqueous alkali silicate such as sodium silicate or potassium silicate shown in Table 1 above that has been chemically modified with aluminum. Although sodium silicate and potassium silicate are the most common forms of aqueous alkali silicate, other existing commercial forms such as lithium silicate or quaternary ammonium silicate can also be used within the scope of this invention. Moreover, while the focus of this disclosure is on sodium aluminosilicate, this invention would be applicable to other forms of aqueous alkali aluminosilicate. The prepared aqueous alkali aluminosilicate is stable and can be stored under ambient conditions for months.

The most common method for the production of sodium silicate and potassium silicate is the fusing of high purity sand with either soda ash or potassium carbonate in a furnace. The ratio of $SiO_2$ to $Na_2O$ (or $K_2O$) is dependent on the quantity of raw material. This process can be represented by the following equation:

$$Na_2CO_3 + SiO_2 \longrightarrow (SiO_2)_x \cdot (Na_2O) + CO_2 \quad x=1.5 \text{ to } 4.0$$

(sodium silicate)

The chemical and physical properties of alkali metal silicates are controlled by the ratio of $SiO_2$ to $Me_2O$.

Alkali metal silicates can be converted to alkali aluminosilicate by addition of a caustic source of aluminum to the alkali silicate. Most commonly, the source of aluminum is the solution resulting from dissolving alumina trihydrate in sodium hydroxide, also called the sodium aluminate solution. The sodium aluminate solution is contacted with the sodium silicate solution under controlled conditions of temperature and mixing to form the soluble sodium aluminosilicate liquid. Aqueous alkali aluminosilicates can also be prepared using other sources of alkali silicate such as potassium silicate or lithium silicate, As previously described, aqueous alkali aluminosilicate is not a zeolite. The $SiO_2$ to $Al_2O_3$ ratio is higher than 5 and has a $Me_2O$ to $Al_2O_3$ ratio greater than 1. A wide range of aqueous alkali aluminosilicate products may be made with varying properties. The higher the $SiO_2$ to $Al_2O_3$ ratio, the greater the aqueous alkali aluminosilicate product performed like a traditional alkali silicate. Using the above described method, a stable aqueous sodium aluminosilicate was prepared with a weight composition of 27.0% $SiO_2$, 15.8% $Na_2O$, 1.7% $Al_2O_3$, and 55.5% water. This equates to a molar ratio of $Na_2O:Al_2O_3:SiO_2$ of 1:0.07:1.8.

Example 1

An aqueous sodium aluminosilicate was prepared having the previously indicated composition. The aluminosilicate system solution was mixed with deionized water at the indicated weight to weight ratios. A Brookfield PVS rheometer was used to measure crystallization time. Viscosity readings were taken at predetermined time intervals at a shear rate of 5.11 s$^{-1}$. Prior to crystallization the aqueous alkali aluminosilicate increased in viscosity. Viscosity changes were monitored as a function of time, temperature and chemical additives.

Aqueous alkali aluminosilicate can be made to crystallize by diluting with water. Table 2 a indicates the time for crystallization at 45° C. In contrast, aqueous sodium silicate is infinitely soluble in fresh water. Table 2B shows the long term properties of a 1:1 weight to weight mix of aqueous alkali aluminosilicate to water.

TABLE 2A

| | Crystallization Time vs. dilution with water | | | |
|---|---|---|---|---|
| Test # | Aqueous Sodium Aluminosilicate | Water | Ratio | Time to Crystallization |
| 1 | 10 g | 20 g | 1:2 | 4 minutes |
| 2 | 12 g | 18 g | 2:3 | 7 minutes |
| 3 | 15 g | 15 g | 1:1 | 25 minutes |
| 4 | 18 g | 12 g | 3:2 | 75 minutes |
| 5 | 20 g | 10 g | 2:1 | Did not set after 24 hrs |

TABLE 2B

| Long term Properties of Aqueous Sodium Aluminosilicate Diluted & Set with Water | | |
|---|---|---|
| Room Temperature | Initial Cured Physical Properties | Physical Properties after 3 Months |
| 50% AAAS | Flexible, no syneresis* | Flexible, no syneresis* |

*Syneresis measured by diameter change in open circular container at room temperature

Example 2

Example 2 measured the effect of temperature on rate of crystallization at a constant ratio of aqueous sodium aluminosilicate to water. The results are shown in Table 3.

TABLE 3

| Test # | Aqueous Sodium Aluminosilicate (g) | Water (g) | Temperature | Time to Crystallization |
|---|---|---|---|---|
| 1 | 15 g | 15 g | 25° C. | 210 minutes |
| 2 | 15 g | 15 g | 45° C. | 25 minutes |
| 3 | 15 g | 15 g | 65° C. | 5 minutes |
| 4 | 15 g | 15 g | 85° C. | <1 minute |

By knowing the downhole temperature, the rate of crystallization can be modified by any number of techniques including adjusting the level of dilution of the aqueous aluminosilicate with water, increasing the alkalinity of the solution, and altering the relative composition of $SiO_2$ to $Na_2O$ to $Al_2O_3$.

Example 3

Example 3 shows the crystallization rate at a constant ratio of aqueous sodium aluminosilicate can be slowed by increasing alkalinity. A 50% solution of NaOH was added to water and then mixed into the aqueous sodium aluminosilicate. Reaction temperature was 45° C. The results are shown in Table 4.

TABLE 4

| Test # | Aqueous Sodium Aluminosilicate (g) | Water (g) | NaOH (50%) (g) | Time to Crystallization |
|---|---|---|---|---|
| 1 | 15 g | 15 g | — | 25 minutes |
| 2 | 15 g | 15 g | 0.75 g | 75 minutes |

Example 4

The crystallization reaction is not affected by the presence of sodium chloride. To illustrate the effect of sodium chloride, different level of NaCl were dissolved in tap water. The prepared water was added at 25° C. to aqueous alkali aluminosilicate to give a solids content of 25%. Crystallization was measured using the previously described method.

TABLE 5

| NaCl in water | Start of crystallization |
|---|---|
| 0% | 135 min |
| 2 | 120 min |

TABLE 5-continued

| NaCl in water | Start of crystallization |
|---|---|
| 4 | 120 min |
| 6 | 135 min |

Example 5

Example 5 compares the compressive strength and water resistance of a sandy soil that has been bonded using aqueous alkali aluminosilicate compared to 3.2 ratio sodium silicate or zeolite A. No setting agents were used with the binders. Basic experimentation involved mixing aqueous alkali aluminosilicate or N® sodium silicate by the indicated weight percent to soil. In the case of zeolite A, the zeolite was prepared as a 50% by weight slurry in water. A 150 g of soil & binder was placed in a die and pressed with compaction pressure of 250 psi for 10 second. The compressive strength (Newtons) was measured after soil cores were aged for overnight (~16 hours) on the bench at room temperature.

Water resistance was measured by submersing the pellets bonded with 10% wt/wt binder in water and measuring stability. Pellets bonded with zeolite A lost shape after 5 minutes submerged in water. Pellets bonded with 3.2 ratio sodium silicate had partial shape after 16 hrs and aqueous alkali aluminosilicate bonded pellets retained shape.

TABLE 6

| | Compressive Strength vs. Binder Type | | | | |
|---|---|---|---|---|---|
| Chemical Charge | 0% | 5% | 10% | 12% | 14% |
| AAAS | 894 N | 1289 N | 2653 N | 3566 N | 3718 N |
| N silicate | 894 N | 1027 N | 2659 N | 2615 N | 2581 N |
| 50% slurry of Zeolite A | 894 N | 920 N | 1136 N | — | 1332 N |

Example 6

Table 7 shows the interaction of aqueous alkali aluminosilicate with common setting agents found in oilfield applications and in general soil stabilization (grouting), compared to 3.2 ratio sodium silicate. As shown in Table 7, provides for a longer more controlled short term curing time. Inorganic reactions are similar but certain complex organic reactions can differ.

TABLE 7

Setting Agents ~20 Parts To 100 Parts AAAS Or Diluted Silicate
AAAS (GPA) with Conventional Silicate Setting Agents

| | AAAS | | Sodium Silicate N 50% | |
|---|---|---|---|---|
| Setting Agent | Set Formation Time | Drying/Curing (Hardening) Time | Set Formation Time | Drying/Curing (Hardening) Time |
| 25% Sulfuric Acid | <5 minutes | 2-3 Days | Immediate set | 2-3 days |
| Diacetin | Soft set <5 min | >7 days | Immediate soft set | 3-4 days |
| Triacetin | Viscous, soft set after 7-8 days | 2 weeks, still soft | 30-35 min soft set | 3-4 days |
| Diacetin/Triacetin 50:50 | Set ~5 min | 2 weeks, still soft | ~1 min soft set | 3-4 days |
| 20% $CaCl_2$ | Immediate set | 24 hrs | Immediate set | 24 hrs |

Example 7

Figure 1:
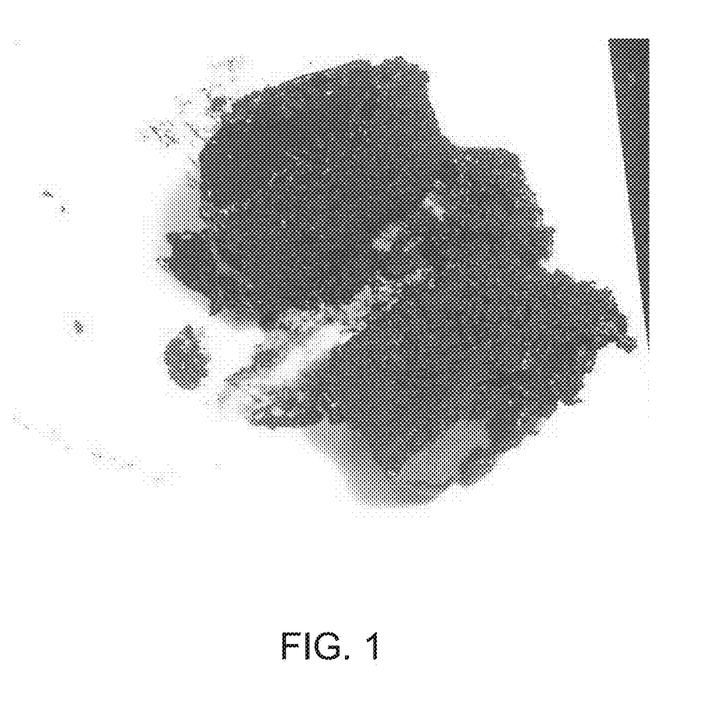
FIG. 1 is a photographic representation of a 1:1 blend of aqueous alkali aluminosilicate with the weighted oil-based drilling fluid of the present invention.

Example 7 shows how aqueous alkali aluminosilicate can be used to control loss circulation additive for drilling fluids including oil-based drilling fluids. Oil-based drilling fluids are a broad class of drilling fluid formulated with different oils, internal phases, surfactants, additives and weighting material. Oil-based drilling fluids become more heterogeneous after use in the field. Two oil-based drilling fluids were obtained from well sites. The first oil-based drilling fluid contained weighting material and drill solids and the second oil-based mud had no weighting material and was low in drill solids. When the first oil-based drilling fluid was mildly mixed with aqueous alkali aluminosilicate, the drilling fluid thickens to a solid. These reactions were quicker and more pronounced with aqueous alkali aluminosilicate than with sodium silicate. Table 8 shows the viscosity of oil-based drilling fluid mixed 1:1 by weight with aqueous alkali aluminosilicate as well as mixed 1:1 by weight with 3.2 ratio sodium silicate. FIG. 1 is a visual representation of a 1:1 blend of aqueous alkali aluminosilicate with the weighted oil-based drilling fluid. This reactive drilling fluid would be useful for sealing fractures or porous zones.

TABLE 8

|  | Initial visc | 5 min | 10 min | 15 min |
|---|---|---|---|---|
| Oil-based drilling fluid | 794 cps | 794 cps | 794 cps | 794 cps |
| 1:1 oil-based drilling fluid to AAAS | 1420 | 5960 | 23840 | 56650 |
| 1:1 oil-based drilling fluid to sodium silicate | 1930 | 3830 | 3490 | 3890 |

Viscosity taken at 45° C.

The second oil-based drilling fluid was unreactive towards sodium silicate as well as aqueous alkali aluminosilicate under mild mixing conditions. The unreactive oil-based drilling fluid could be made reactive by adding propylene carbonate or any other suitable catalyst to the oil-based drilling fluid. Testing simulated oil-based drilling fluids loss in a porous formation. Propylene carbonate was mixed into oil-based mud. This mixture was then mixed with sand to the point of saturation. Aqueous alkali aluminosilicate and 3.2 ratio sodium silicate were added on active ingredient equal basis of 3.6 wt %. Silicate was mixed with sand/oil mud/propylene carbonate. 200 g of material was placed in a Carver press and compaction pressure of 2000 psi was applied for 5 minutes. The compaction pressure and time was selected to simulate downhole conditions. Table 9 indicates the compressive strength or the sand core.

TABLE 9

|  | 1:4 Propylene Carb:Silicate | 1:8 Propylene Carb:Silicate |
|---|---|---|
| 3.2 ratio Sodium Silicate | 415 N | 482 N |
| AAAS | 5148 N | 4220 N |

Example 8

It is common in drilling, mining and construction to encounter subterranean formations with natural fractures. These types of formations often require some type of plugging/bridge forming material to help fill and seal the fracture. There is a wide range of material that may be used as bridging material including but not limited to; graphite, cellulosic material, natural fibers, mineral fibers, flakes, plastic pieces and granular material.

Aqueous alkali aluminosilicate can be formulated with many of the commonly used bridging material to act as a matrix binder. Table 10 compares the compressive strength at various time intervals with plugs formulated with ground marble and walnut hulls as the bridging material and propylene carbonate as a setting agent.

TABLE 10

| Compressive Strength vs. Time | | | | | | | | | |
|---|---|---|---|---|---|---|---|---|---|
| AAAS | 3.2 ratio Sodium Silicate | Prop. Carb. | Walnut Hull | CaCO$_3$ | Comp. Strength 10 min - psi | Comp. Strength 30 min - psi | Comp. Strength 1 hr - psi | Comp. Strength 24 hr - psi |
| 0 g | 20 g | 7.5 g | 7.5 g | 20 g | 236 | 123 | 214 | 106 |
| 20 g | 0 | 7.5 g | 7.5 g | 20 g | 409 | 340 | 344 | 966 |

Example 9

Aqueous alkali aluminosilicate has several performance advantages when formulated as an activator for traditional Portland cement as well as Pozzolanic materials such as flyash or slag sources. A disadvantage of using sodium silicate as an activator for pozzolanic material has been insufficient green strength with too rapid set times. Quick set times make it difficult to place the cement/silicate mix and once placed, there is the cost of waiting for final strength to develop. Table 11 shows that a higher strength plug can be developed using aqueous alkali aluminosilicate in combination with a class F flyash. The system was formulated as a two component system with a flyash/water slurry as the first component followed by aqueous alkali aluminosilicate. Upon mixing, signs of viscosity development were present and at the 10 minute mark with good early strength at 3 hours and higher strength at 24 hours. By comparison the use of 3.2 ratio sodium silicate under similar experiments showed nearly instant set when combined with flyash. The plugs showed poor green strength but did have similar strength levels after 24 hrs

TABLE 11

Compressive Strength

| 3.2 ratio Sodium Silicate | AAAS (g) | Water (g) | Flyash (g) | Temp. (° C.) | Compressive Strength 3 hr | Compressive Strength 24 hr |
|---|---|---|---|---|---|---|
| — | 15 | 45 | 120 | 37.5 | 875 N | 3327 N |
| 15 | — | 45 | 120 | 37.5 | 228 | 3220 |

Example 10

Cementing is an essential component of water control in the oilfield, mining, soil stabilization and general construction. Over the last twenty to thirty years pozzolanic cements have become accepted in these applications through the development of flyash as a substitute for Portland cement. Flyash is a waste product left over from coal-fired power plants or incinerators and is classed as a pozzolan as it is rich in silica, alumina and calcium; it forms cementitious compounds when mixed with highly alkaline products such as lime.

Flyash is also an integral component of geopolymers where Portland cement is excluded. Much has been written about geopolymers since the term was introduced by Davidovits in 1972. Traditionally a sodium silicate was used to set the flyash cement after the mix was "activated" with sodium hydroxide.

Because of the alkalinity demonstrated by high pH values of ≥11 for aqueous alkali aluminosilicate, sodium, potassium, lithium silicates and crystalline metasilicates, these products are well suited to geopolymer types of applications without the addition of sodium hydroxide. Davidovits' published patent application 20100010139A recognizes that silicates can adequately activate and set pozzolanic elements without the addition of sodium or potassium hydroxide. Aqueous alkali aluminosilicate has the added benefit of curing to full strength within 24 hours for Class C flyash; Class F and Activated Class F flyashes are slower curing, but faster than the conventional silicates as shown in Table 8. Class C Flyash has higher calcium oxide content and is therefore more reactive with silicates. When setting conventional silicates, strength development through curing time is dependent on drying time. The reaction of aqueous alkali aluminosilicate with Class C flyash is especially useful in shotcrete applications and cement grouting.

TABLE 11

Flyash/Silicate Reaction Times; Added At 3-5% Equivalent Solids Loading

| Silicate Product | Setting | Minimum Drying/ Curing Time | Load to Failure 1 Day (N) | Load to Failure 3 Days (N) | Load to Failure 7 Days (N) |
|---|---|---|---|---|---|
| F Class Flyash | | | | | |
| AAAS | Smooth paste, stiff 15-30 min | 2-3 Days | 388 | 573 | 1667 |
| N Sodium Silicate | Smooth paste 15 min | 4-5 Days | Spongy | 215 | 1021 |
| D Sodium silicate | Smooth paste 15 min | 4-5 Days | Spongy | 521 | 834 |
| Metso 2048 | Smooth paste 15 min | 4-5 Days | 171 | 249 | 1926 |
| Activated Class F Flyash | | | | | |
| AAAS | Smooth paste 10 min | 2-3 Days | 1241 | 2675 | 2489 |
| N Sodium Silicate | Smooth paste 15 min | 4-5 Days | Spongy | 215 | 791 |
| D Sodium Silicate | Smooth paste 15 min | 4-5 Days | Spongy | 191 | 1359 |
| Metso 2048 | Smooth paste 15 min | 4-5 Days | Spongy | 117 | 443 |
| Class C Flyash | | | | | |
| AAAS | Stiff paste 1 min | 12-24 Hours | 5251 | 5251 | 5251 |
| N Sodium Silicate | Stiff paste 5 min | 1-2 Days | 813 | 700 | 1347 |
| D Sodium Silicate | Stiff paste 5 min | 1-2 Days | 783 | 834 | 1683 |
| Metso 2048 | Stiff paste 5 min | 1-2 Days | 251 | 361 | 1926 |

Figure 2:
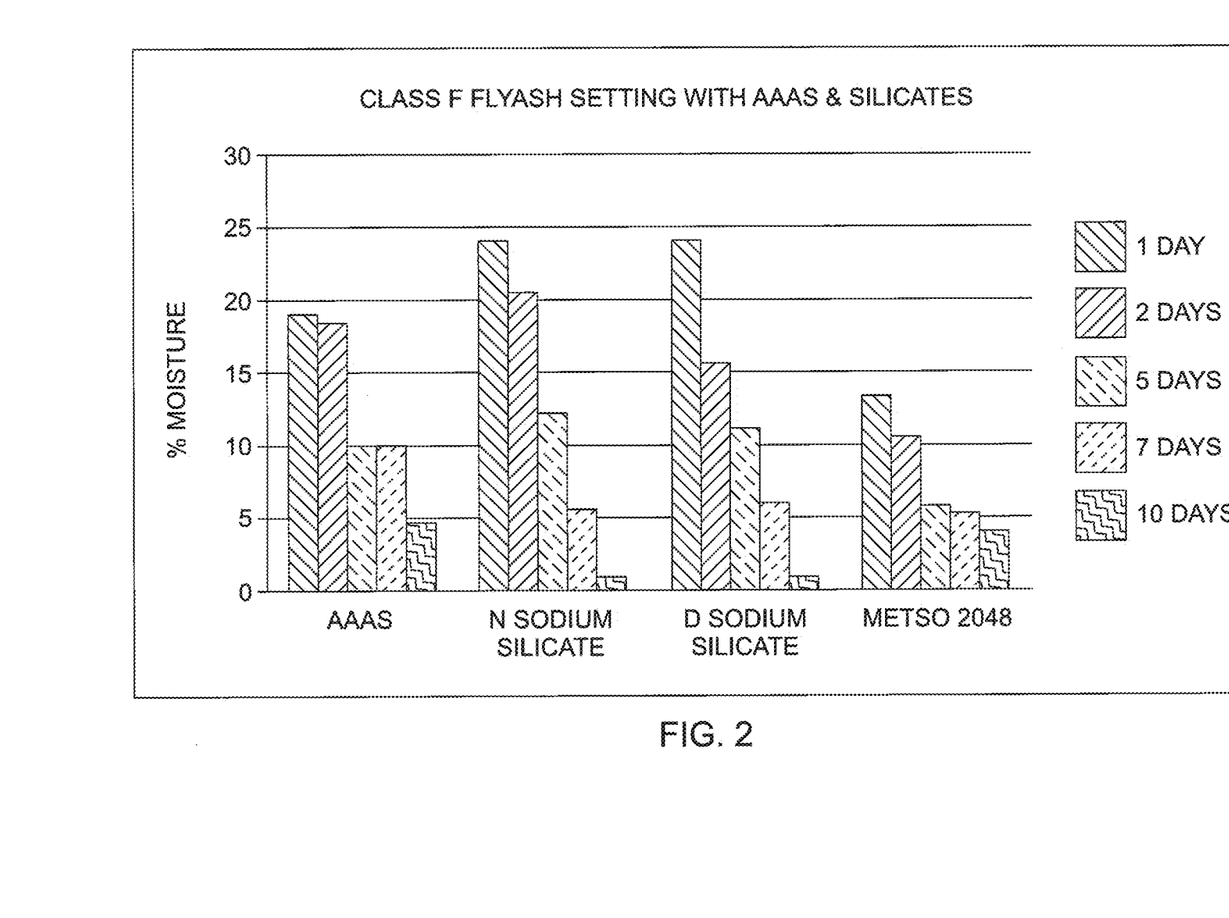
FIG. 2 is a series of bar graphs summarizing drying of silicate/flyash mixes through moisture determinations over time for aqueous alkali aluminosilicate, compared to conventional silicates
Figure 3:
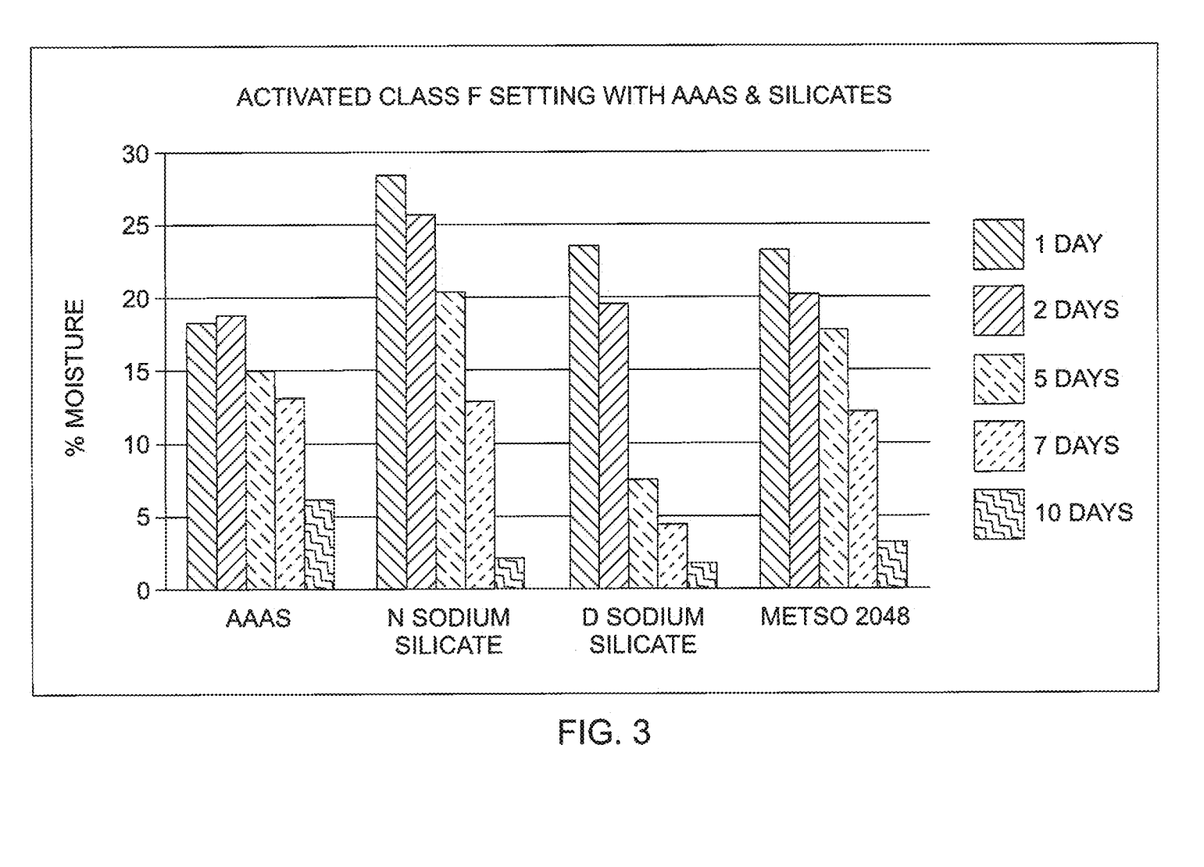
FIG. 3 is a series of bar graphs summarizing drying of silicate/flyash mixes through moisture determinations over time for aqueous alkali aluminosilicate, compared to conventional silicates
Figure 4:
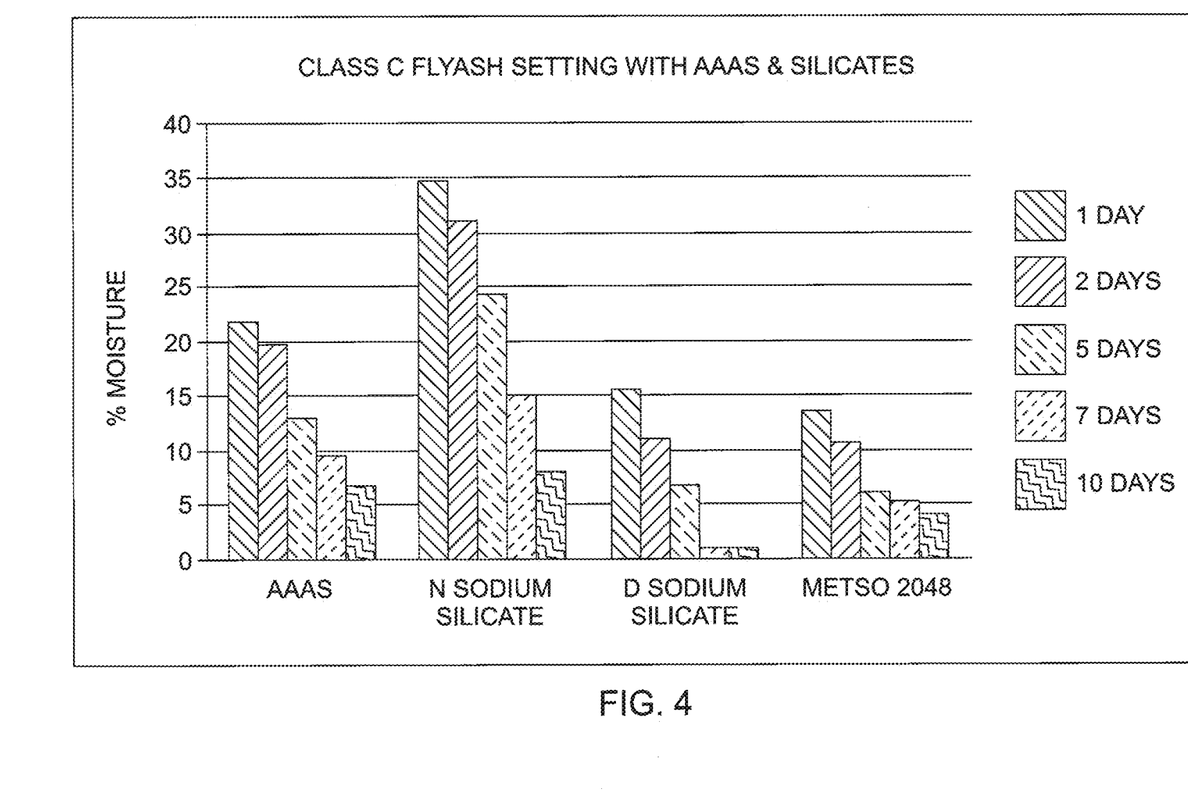
FIG. 4 is a series of bar graphs summarizing drying of silicate/flyash mixes through moisture determinations over time for aqueous alkali aluminosilicate, compared to conventional silicates

FIGS. 2, 3 and 4 summarize drying of silicate/flyash mixes through moisture determinations over time for aqueous alkali aluminosilicate, compared to conventional silicates.

Patents, patent applications, publications, scientific articles, books, web sites, and other documents and materials referenced or mentioned herein are indicative of the levels of skill of those skilled in the art to which the inventions pertain, as of the date each publication was written, and all are incorporated by reference as if fully rewritten herein. Inclusion of a document in this specification is not an admission that the document represents prior invention or is prior art for any purpose.

Although the invention is illustrated and described herein with reference to specific embodiments, the invention is not intended to be limited to the details shown. Rather, various modifications may be made in the details within the scope and range of equivalents of the claims and without departing from the invention.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Use of the term "about" should be construed as providing support for embodiments directed to the exact listed amount. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method for providing conformance in subterranean environments comprising the steps of:
   (a) introducing an aqueous alkali aluminosilicate solution into a downhole which is connected to said subterranean environment, said aqueous alkali aluminosilicate solution comprising a soluble alkali aluminosilicate dissolved in said aqueous alkali aluminosilicate solution; and
   (b) setting said aqueous alkali aluminosilicate solution while in said downhole.

2. The method of claim 1 wherein said subterranean environment is one of an oil field, a mine, and soil stabilization in construction.

3. The method of claim 1 wherein said aqueous alkali aluminosilicate solution is crystallized by diluting it with water.

4. The method of claim 1 wherein said aqueous alkali aluminosilicate solution is crystallized by heat present in downhole conditions.

5. The method of claim 1 wherein said aqueous alkali aluminosilicate solution is crystallized by increasing the pressure in said downhole.

6. The method of claim 1 wherein said aqueous alkali aluminosilicate solution is crystallized by agitating said alkali aluminosilicate in said downhole.

7. The method of claim 1 wherein said aqueous alkali aluminosilicate solution is crystallized by introducing seed crystals into said downhole.

8. The method of claim 1 wherein said aqueous alkali aluminosilicate is selected from the group consisting of sodium aluminosilicate, potassium aluminosilicate, lithium aluminosilicate, and quaternary ammonium aluminosilicate.

9. The method of claim 1 wherein said soluble alkali aluminosilicate has a silicon to aluminum molar ratio of greater than 5.

* * * * *